(12) United States Patent
Blank et al.

(10) Patent No.: US 7,485,389 B2
(45) Date of Patent: Feb. 3, 2009

(54) ELECTROCHEMICAL FUEL CELL STACK

(75) Inventors: Felix Blank, Constance (DE); Ottmar Schmid, Markdorf (DE); Markus Schudy, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 451 days.

(21) Appl. No.: 10/466,006

(22) PCT Filed: Dec. 15, 2001

(86) PCT No.: PCT/DE01/04746

§ 371 (c)(1),
(2), (4) Date: Jul. 9, 2003

(87) PCT Pub. No.: WO02/056402

PCT Pub. Date: Jul. 18, 2002

(65) Prior Publication Data

US 2004/0028985 A1 Feb. 12, 2004

(30) Foreign Application Priority Data

Jan. 10, 2001 (DE) ................................ 101 00 757

(51) Int. Cl.
*H01M 2/14* (2006.01)
(52) U.S. Cl. ............................ 429/39; 429/34; 429/38
(58) Field of Classification Search .................... 429/34
See application file for complete search history.

(56) References Cited

U.S. PATENT DOCUMENTS

| | | | | |
|---|---|---|---|---|
| 5,686,199 A * | 11/1997 | Cavalca et al. ............... | 429/30 |
| 5,858,567 A * | 1/1999 | Spear et al. ................... | 429/12 |
| 5,945,232 A * | 8/1999 | Ernst et al. .................... | 429/32 |
| 5,981,098 A * | 11/1999 | Vitale ............................ | 429/34 |
| 6,071,635 A * | 6/2000 | Carlstrom, Jr. ............... | 429/34 |
| 6,074,592 A | 6/2000 | Hulett .......................... | 427/115 |
| 6,099,984 A * | 8/2000 | Rock ............................. | 429/39 |
| 6,461,754 B1 * | 10/2002 | Zeng ............................. | 429/26 |
| 6,893,770 B2 * | 5/2005 | Rock ............................. | 429/39 |

FOREIGN PATENT DOCUMENTS

| | | |
|---|---|---|
| EP | 0955686 | 11/1999 |
| JP | 3040369 | 2/1991 |
| JP | 05159790 | 6/1993 |
| JP | 09-050819 | 2/1997 |
| JP | 10284094 | 10/1998 |
| JP | 2000067885 | 3/2000 |
| JP | 2000090947 | 3/2000 |
| JP | 2001126746 | 11/2001 |
| WO | 9733331 | 9/1997 |

* cited by examiner

*Primary Examiner*—Patrick Ryan
*Assistant Examiner*—Cynthia Lee
(74) *Attorney, Agent, or Firm*—Davidson, Davidson & Kappel, LLC

(57) ABSTRACT

An electrochemical fuel cell stack includes a membrane electrode assembly and a distributor plate. The distributor plate includes a channel region having gas channels for distributing reaction gas to the membrane electrode assembly, a first port area for supplying reaction gas to the channel region, and a second port area for removing reaction gas from the channel region. The gas channels are disentangled and each distributed in a respective separate channel area, at least one of the gas channels having at least one deflection point between the first and second port areas.

14 Claims, 3 Drawing Sheets

ELECTROCHEMICAL FUEL CELL STACK

The present invention relates generally to electrochemical fuel cell stacks, and in particular to an electrochemical fuel cell stack including a membrane electrode assembly and a distributor plate, wherein the gas channels in the channel area of the distributor plate are disentangled and distributed among a plurality of separate channel.

BACKROUND

Fuel cell stacks according to the related art include at least one but usually a plurality of individual fuel cells stacked side by side or one above the other. A single cell has two distributor plates for distributing the fluids and a membrane electrode assembly, abbreviated as MEA, situated between them. One MEA includes an electrode, a cathode, and a proton-conducting electrolyte membrane situated between them. Transport of protons from the anode to the cathode is ensured by the proton exchange membrane (PEM). The distributor plates have gas channels (anode and cathode channels) on the anode and cathode sides for supplying and removing the fuel-containing anode gas, e.g., hydrogen, and the oxygen-containing cathode gas, e.g., air. Because of the gas flow, a pressure gradient develops along the gas channels, so that the product water formed in the fuel cell reaction is transported out of the gas channels.

Gas-permeable diffusion electrodes are usually situated between the MEA and the distributor plate. Diffusion of the anode gas and cathode gas, also referred to below as reaction gases, into the regions where the MEA is in contact with the distributor plate is made possible by these gas diffusion electrodes. This increases the active area in which proton transport, and thus a chemical reaction, may take place. Such a gas diffusion electrode is described in Japanese Patent 3040369, for example.

The gas channels for distributing the fluids are usually situated in a serpentine configuration between the port areas. U.S. Pat. No. 6,074,692 discloses an embodiment of a distributor plate in which the fluids are guided in serpentine gas channels.

FIG. 1 shows a distributor plate 1 having serpentine configuration of gas channels 3 according to the related art. Several gas channels 3 combined into a bundle run in a serpentine pattern between the port areas for supplying and removing the reaction gases. Each gas channel 3 is subdivided into a plurality of gas channel sections 4 between deflection points (serpentine). Gas channel sections 4 of adjacent gas channels 3 thus have different lengths, resulting in pressure gradients between individual gas channel sections 4. At locations where adjacent gas channel sections 4 have a high pressure difference, the reaction gas may flow in an uncontrolled manner over the gas diffusion electrode from one gas channel section 4 to an adjacent gas channel section 4. This makes it possible for reaction gas to flow from one gas channel 3 into an adjacent gas channel 3. However, it is also possible for reaction gas to flow over a plurality of adjacent gas channel sections 4.

Thus, at certain locations along the gas channels, there may be an undersupply of reaction gas to the MEA, which results in disadvantages with regard to the fuel cell power.

It should be emphasized here that this refers to an uncontrolled and undefined flow of the reaction gas between adjacent gas channels over the entire area of the distributor plate. A defined flow between adjacent gas channel sections so that the reaction gas enters the regions of the MEA where the distributor plate is in contact with the MEA is definitely desirable to increase the active area and thus increase the fuel cell power.

Another possibility of a gas channel design is described in European Patent Application 0955686 A1. The gas channels run between the port areas for supplying and removing the reaction gases in parallel and without any deflection. Due to the fact that adjacent gas channels are of equal length, there is no pressure gradient between adjacent gas channels. Therefore, cross flow is completely suppressed. Reaction gas thus cannot reach locations where the MEA is in contact with the distributor plate. Another disadvantage is that the cross sections of the gas channels must be reduced significantly to ensure an appropriate pressure gradient along the gas channels for discharge of the product water. Due to this reduction in the gas channel cross sections, there are disadvantages with regard to the smaller manufacturing tolerance required and the associated increase in manufacturing costs.

SUMMARY OF THE INVENTION

An object of the present invention is to provide a fuel cell stack with which it is possible to implement a defined flow between gas channel sections without resulting in uncontrolled cross flow over the entire area of the distributor plate and without requiring a high degree of manufacturing complexity, so that reaction gas reaches the areas of the MEA where the MEA is in contact with the distributor plate.

The present invention provides an electrochemical fuel cell stack including: a membrane electrode assembly and a distributor plate. The distributor plate includes a channel region having a plurality of gas channels configured to distribute at least one of an anode gas and a cathode gas to the membrane electrode assembly; a first port area configured to supply at least one of the anode gas and the cathode gas to the channel region; and a second port area configured to remove at least one of the anode gas and the cathode gas from the channel region; wherein the gas channels are disentangled and each distributed in a respective separate channel area, a first of the gas channel having at least one deflection point between the first and second port areas.

In the fuel cell stack according to the present invention, the gas channels in the channel area of the distributor plate are no longer combined in a bundle, but instead they are disentangled and distributed among a plurality of separate channel areas, one gas channel in one channel area having at least one deflection running between the port areas for supplying and removing the anode gas and/or cathode gas. The gas channel may run in a serpentine pattern, for example, within the channel area.

Unwanted and uncontrolled cross flow between adjacent gas channels is suppressed due to the configuration of the gas channels according to the present invention in separate channel areas. Within one channel area, the gas channel is subdivided by the deflection into adjacent gas channel sections.

The configuration according to the present invention makes it possible to achieve a desired and well-defined cross flow within a gas channel. A well-defined cross flow thus occurs only between the adjacent gas channel sections of a gas channel. This ensures that the regions in which the MEA is in contact with the distributor plate are supplied with reaction gas, whereas unwanted cross flow between adjacent channel areas and thus between different gas channels is suppressed.

Another advantage of the present invention is that the disentangling of the gas channels and the division of the channel area of the distributor plate into neighboring channel areas is implementable without any great manufacturing complexity.

In addition, with the configuration of gas channels according to the present invention, there is no undersupply of reaction gas to certain gas channel sections. In addition, the equal distribution of reaction gases along the gas channels and the discharge of water out of the gas channels are ensured. This yields advantages with regard to the fuel cell power output.

In an advantageous embodiment of the present invention, the pressure gradient between adjacent gas channel sections of a gas channel within a channel area may be adjusted via the distance between adjacent gas channel sections. This yields the advantage that a defined cross flow is possible between adjacent gas channel sections. Through a suitable configuration of the gas channel sections of a gas channel, it is possible to achieve the effect of a constant pressure gradient prevailing along the gas channel between adjacent gas channel sections of a gas channel.

To achieve optimum utilization of the surface area of the distributor plate, the distance between the gas channel sections should not be too great.

In particular, by varying the number of channel areas according to the present invention in the distributor plate, it is possible to vary the total length of the gas channels. Therefore, the pressure drop which develops between the port areas for supplying and removing the reaction gases is adjustable.

In another preferred embodiment of the present invention, the flow of reaction gas between the port areas has a spatial component in the direction of the field of gravity. This may be achieved, e.g., by situating the port area for supplying the reaction gases above (as seen in the direction of the field of gravity) the port area for removing the reaction gases in the fuel cell stack. This prevents reaction gas from flowing in the gas channels opposite the direction of the force of gravity. In addition, if condensate develops, water deposits will not form within the gas channels. This in turn yields other advantages with regard to the fuel cell power output.

In an advantageous embodiment of the present invention, the fuel cell stack has a distributor structure for a coolant. The coolant, preferably air, and the reaction gas advantageously flow in co-current through the fuel cell stack. Therefore, the temperature of the reaction gas rises continuously along the gas channel, resulting in an increasing water vapor partial pressure in the gas channel due to the product water thus formed. The relative moisture content of the reaction gas in the gas channel is thus kept almost constant over the entire length of the channel between the port areas. Therefore a homogeneous moistening of the reaction gas and of the MEA is achieved along the gas channel, resulting in additional advantages with regard to an improved long-term stability of the fuel cell.

BRIEF DESCRIPTION OF THE DRAWINGS

The present invention is elaborated upon below on the basis of exemplary embodiments with reference to the drawings.

DETAILED DESCRIPTION

Figure 1:
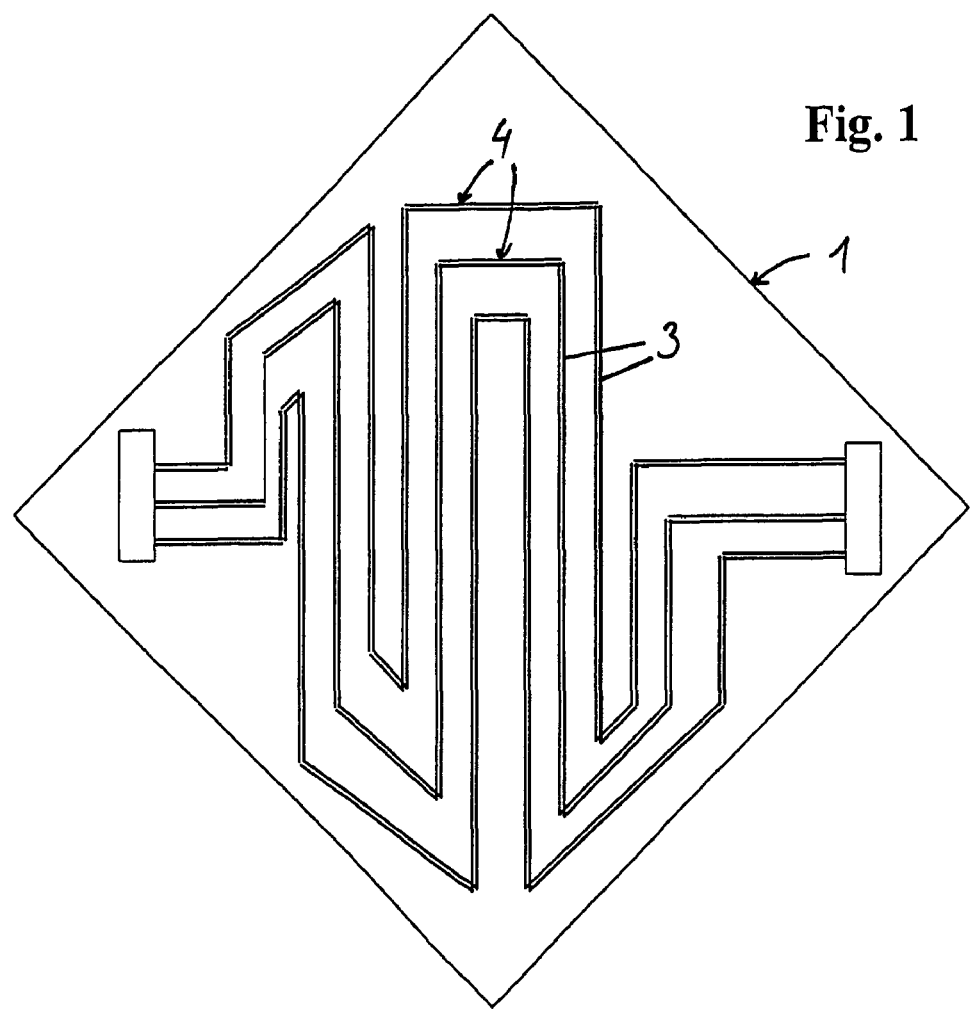
FIG. 1 shows a distributor plate having a serpentine configuration of gas channels according to the related art.
Figure 2:
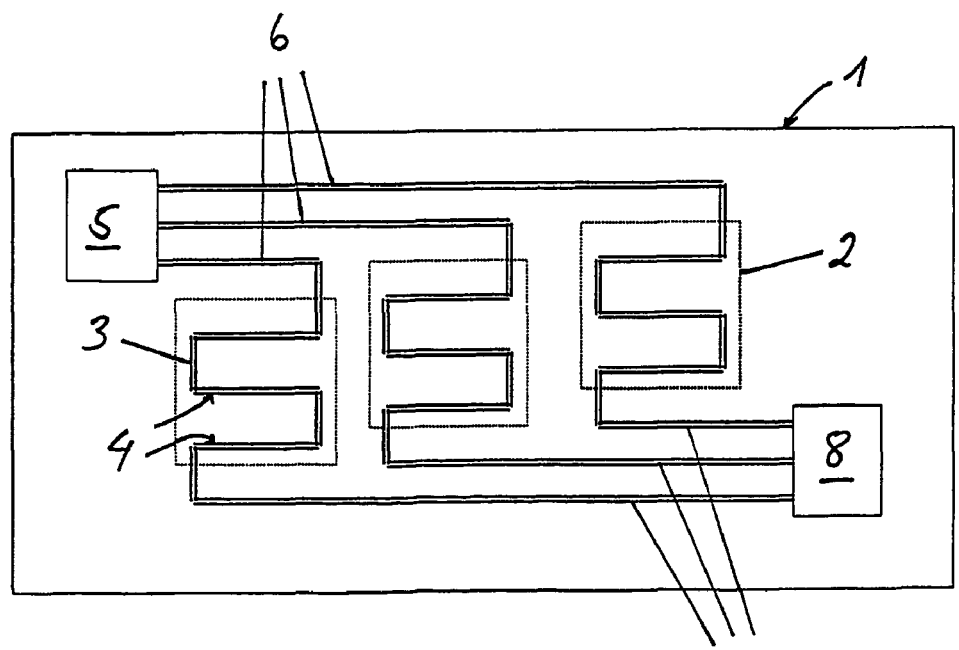
FIG. 2 shows a first embodiment of a distributor plate according to the present invention having three channel areas, the gas channel sections of the gas channels of the channel areas being designed to be parallel to one another.

FIG. 2 shows an embodiment of a distributor plate 1 according to the present invention having three channel areas 2 (area delimited by dotted lines). Gas channels 3 run in a serpentine pattern within channel areas 2, gas channel sections 4 being situated between the deflection points. These gas channel sections 4 of a gas channel 3 are situated in parallel to one another in this embodiment, each section being the same length.

Connecting channels 6 run between port area 5 for supplying the reaction gas and channel areas 2. One connecting channel 6 connects port area 5 to one end of serpentine gas channel 3 of a channel area 2. The other end of serpentine gas channel 3 is connected by another connecting channel 7 to port area 8 for removing the reaction gas. The reaction gas thus passes from supply port area 5 to removal port area 8 of distributor plate 1 through an interconnected channel, which includes connecting channel 6, gas channel 3 and connecting channel 7. Because of the flow, a pressure gradient develops within this channel, ensuring a uniform distribution of the reaction gas along the channel.

A slight pressure gradient develops between gas channel sections 4 of a gas channel 3 running in parallel in channel areas 2. Because of this pressure gradient, there is a defined cross flow between adjacent gas channel sections 4. This cross flow adapts to the pressure gradient prevailing at the particular site of a gas channel section 4. This means that the quantity of gas transported between gas channel sections 4 varies over the total length of gas channel section 4.

It should be emphasized again at this point that this cross flow takes place only within a gas channel of a channel area 2. Unwanted cross flow between adjacent gas channel areas 2 is suppressed by the configuration of gas channels 3 according to the present invention.

Through these measures, it is thus possible to supply reaction gas to the MEA at those locations (not shown here) where the MEA is in contact with the distributor plates.

Since adjacent connecting channels 6, 7 are of different lengths, uncontrolled cross flow may occur there. To suppress this cross flow, the distance between particular connecting channels 6, 7 may be increased and thus adapted to the pressure gradient between connecting channels 6, 7.

Figure 3:
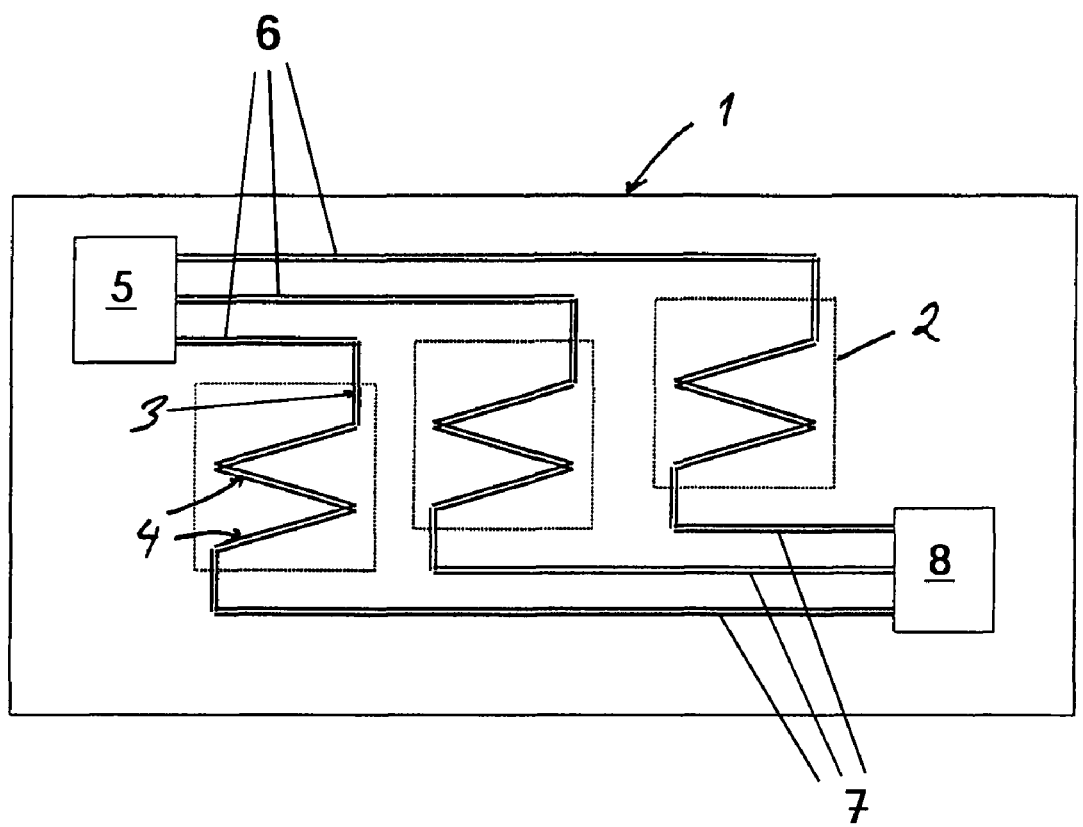
FIG. 3 shows a second embodiment of a distributor plate according to the present invention having three channel areas, the channel gas sections of the gas channels of the channel areas being designed so they are not parallel.

FIG. 3 shows another embodiment of a distributor plate 1 according to the present invention having three channel areas 2. Since the configuration of gas channels 3 and channel areas 2 corresponds to the configuration described in FIG. 2, reference is made to that figure to avoid repetition.

Gas channel sections 4 are not running in parallel with one another, as shown in FIG. 2, but instead form an angle (not shown) to one another. The wedge-shaped distance thus formed between adjacent gas channel sections 4 ensures that the cross flow between these gas channel sections 4 will remain constant for the entire length of gas channel section 4. This results from the fact that there is a great distance from adjacent gas channel section 4 at those locations of gas channel section 4 where a high pressure gradient prevails. The distance is smaller at locations having a low pressure drop. This achieves the result that the cross flow remains constant, i.e., the amount of gas transported from one gas channel section 4 to adjacent gas channel section 4 remains constant.

Figure 4:
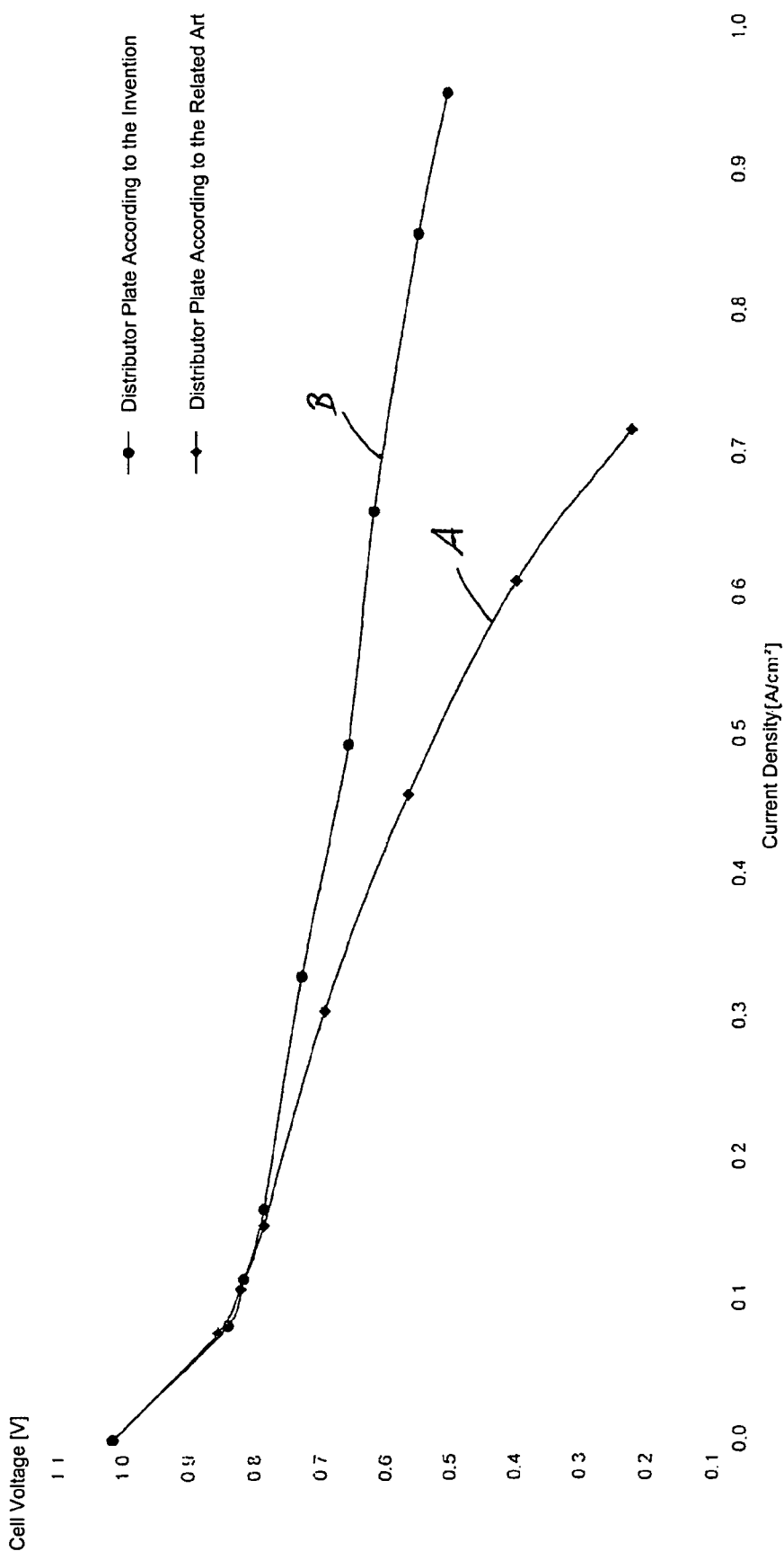
FIG. 4 shows a comparison of the cell voltage of a distributor plate having a serpentine configuration of gas channels according to the related art and the cell voltage of a distributor plate having channel areas according to the present invention.

FIG. 4 shows a comparison of cell voltage A of a distributor plate having serpentine gas channels according to the related art and cell voltage B of a distributor plate having channel areas according to the present invention. In the diagram shown as an example, the cell voltage of the fuel cell has been plotted as a function of current density. The operating temperature of the fuel cell here is 70° C. Air is used as the cathode gas and hydrogen as the anode gas.

The cell voltage curve shows that there is no significant difference between the distributor plates in the range of a low current density (up to approx. 0.15 A/cm$^2$). With an increase in current density, however, there is a sharp drop in cell voltage A. A cell voltage of approx. 0.2 V is measured at a current density of approx. 0.7 A/cm$^2$.

However, a cell voltage of approx. 0.6 V is measured at a current density of approx. 0.7 A/cm$^2$ for cell voltage B of the fuel cell having the channel areas according to the present invention. A high cell voltage is still measurable even at a greater current density. Thus, a cell voltage of 0.5 V is still measured at a current density of 0.95 A/cm$^2$.

The measurement curves show clearly that a higher fuel cell power output is achievable with a distributor plate having the channel areas according to the present invention.

What is claimed is:

1. An electrochemical fuel cell stack comprising:
a membrane electrode assembly; and
a distributor plate, the distributor plate including:
   a channel region having a plurality of channels in said distributor plate configured to distribute at least one of an anode gas and a cathode gas to the membrane electrode assembly;
   a first port area configured to supply at least one of the anode gas and the cathode gas to the channel region; and
   a second port area configured to remove at least one of the anode gas and the cathode gas from the channel region;
   wherein each of the plurality of channels includes a first section, a second section, and a serpentine section connecting the first and second sections, said first section, said second section and said serpentine section defining a gas channel in said distributor plate, each of said serpentine sections having a serpentine pattern and formed in a rectangular area of the distributor plate which is free of an adjacent channel;
   wherein the first section and second section define connecting channels connecting the first port area to the gas channels and the gas channels to the second port area, respectively, and the connecting channels are of different lengths.

2. The fuel cell stack as recited in claim 1 wherein a second of the gas channels is configured so that a pressure gradient between adjacent gas channel sections is equal to a pressure gradient prevailing in the gas channel.

3. The fuel cell stack as recited in claim 2 wherein a distance between the adjacent gas channel sections is configured so as to provide the pressure gradient.

4. The fuel cell stack as recited in claim 1 wherein a flow of at least one of the anode gas and the cathode gas between the first and second port areas has a spatial component in a direction of the field of gravity.

5. The fuel cell stack as recited in claim 1 further comprising a distributor structure for a coolant, the coolant distributor structure being configured so that the coolant flows in co-current with at least one of the anode gas and the cathode gas in the channel areas.

6. The fuel cell stack as recited in claim 1 wherein the first section and second section are linear sections.

7. The fuel cell stack as recited in claim 1 wherein exactly one of the connecting channels corresponds to each of the gas channels.

8. The fuel cell stack as recited in claim 1 wherein the connecting channels are parallel.

9. An electrochemical fuel cell stack comprising: a membrane electrode assembly; and
   a distributor plate, the distributor plate including:
   a channel region having a plurality of channels in said distributor plate configured to distribute at least one of an anode gas and a cathode gas to the membrane electrode assembly;
   a first port area configured to supply at least one of the anode gas and the cathode gas to the channel region; and
   a second port area configured to remove at least one of the anode gas and the cathode gas from the channel region;
   wherein each of the plurality of channels includes a first section, a second section, and a serpentine section connecting the first and second sections, each of said serpentine sections formed in an oval area of said distributor plate which is free of an adjacent channel;
   wherein the first section and second section define connecting channels connecting the first port area to the gas channels and the gas channels to the second port area, respectively, and the connecting channels are of different lengths.

10. An electrochemical fuel cell stack comprising: a membrane electrode assembly; and a distributor plate, the distributer plate including:
    a channel region having a plurality of channels in said distributor plate configured to distribute at least one of an anode gas and a cathode gas to the membrane electrode assembly;
    a first port area configured to supply at least one of the anode gas and the cathode gas to the channel region; and
    a second port area configured to remove at least one of the anode gas and the cathode gas from the channel region;
    wherein each of the plurality of channels includes a first section, a second section, and a serpentine section connecting the first and second sections, each of said serpentine sections disposed within a separate rectangular area of said distributor plate;
    wherein the first section and second section define connecting channels connecting the first port area to the gas channels and the gas channels to the second port area, respectively, and the connecting channels are of different lengths.

11. The fuel cell stack as recited in claim 10 wherein the first section and second section are linear sections.

12. The fuel cell stack as recited in claim 10 wherein the first section and second section are linear sections.

13. An electrochemical fuel cell stack comprising: a membrane electrode assembly; and a distributor plate, the distributor plate including:
    a channel region having a plurality of channels in said distributor plate configured to distribute at least one of an anode gas and a cathode gas to the membrane electrode assembly;
    a first port area configured to supply at least one of the anode gas and the cathode gas to the channel region; and
    a second port area configured to remove at least one of the anode gas and the cathode gas from the channel region;
    wherein each of the plurality of channels includes a first section, a second section, and a serpentine section connecting the first and second sections, each of said serpentine sections disposed within a separate oval area of said distributor plate;

wherein the first section and second section define connecting channels connecting the first port area to the gas channels and the gas channels to the second port area, respectively, and the connecting channels are of different lengths.

14. The cell stack as recited in claim 13 wherein the first section and second section are linear sections.

* * * * *